Figure 1:
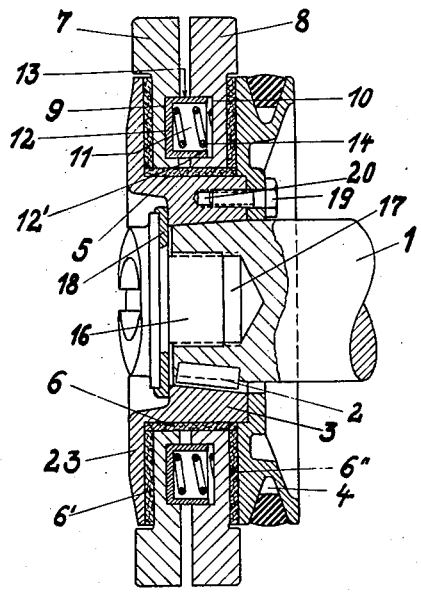

April 4, 1939.  K. SCHWAIGER  2,152,710

MECHANISM FOR ABSORBING TORSIONAL OSCILLATIONS OF SHAFTS

Filed April 14, 1937

Inventor.

Karl Schwaiger

Patented Apr. 4, 1939

2,152,710

UNITED STATES PATENT OFFICE 2,152,710

MECHANISM FOR ABSORBING TORSIONAL OSCILLATIONS OF SHAFTS

Karl Schwaiger, Gaggenau-Baden, Germany, assignor to Daimler-Benz Aktiengesellschaft, Stuttgart-Unterturkheim, Germany Application April 14, 1937, Serial No. 136,805
In Germany May 7, 1935

17 Claims. (Cl. 74—574)

My invention relates to a mechanism for absorbing torsional oscillations of a shaft, more particularly, of the crank shaft of an automotive internal combustion engine.

Mechanisms of this type comprise a support adapted to be attached to the crank shaft of the engine and one or more inertia-accumulators rotatably mounted on the support in frictional engagement therewith.

The objects of the invention are to provide a mechanism of this character which is highly effective in operation and is of a simple and rugged structure and is inexpensive to manufacture and will sustain continued operation without undue wear; to provide a mechanism of the type indicated in which the resilient elements securing the frictional engagement of the oscillation-absorbing members are sheltered and protected from dirt, moisture and injury; and to avoid the use of the customary metallic washers inserted between these members as such washers are liable to produce noise.

In order to attain these objects, I mount two inertia-accumulators on the support attached to the crank shaft and interpose a plurality of resilient elements between these accumulators, whereby the latter are pressed apart and are held in frictional engagement with their support. According to another feature of my invention, means may be provided for slidably guiding the resilient elements relative to at least one of the inertia-accumulators. These guiding means and the resilient elements may be mounted in pockets provided in one of the two inertia-accumulators.

Further objects of the invention will appear from the description following hereinafter, and the features of novelty will be pointed out in the claims.

In the drawing, I have illustrated a preferred embodiment of the invention.

Figure 2:
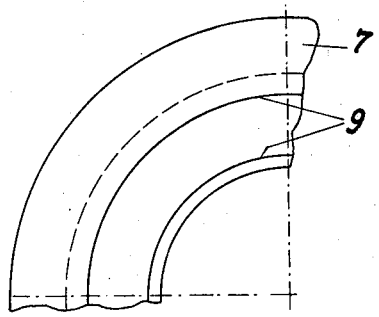
Figure 3:
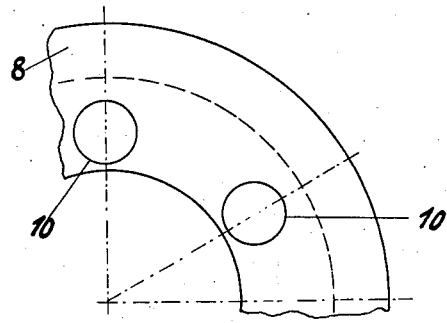

Fig. 1 illustrates an axial section through the novel mechanism mounted on the end of the crank shaft of an automobile engine, and Figs. 2 and 3 are partial elevations of the two inertia-accumulators, the opposed faces thereof being shown.

As shown in Fig. 1, my improved mechanism for absorbing torsional oscillations of the crank shaft 1 comprises a composite support 3, 4 and two disc-shaped inertia-accumulators 7 and 8 which are rotatably mounted on the support and are held in frictional engagement therewith by means to be described hereinafter.

The end of the crank shaft 1 is tapered and forms a seat for the flanged member 3 which is secured against relative rotation to the crank shaft 1 by a key 2 and is firmly held in place by a bolt 16 engaging a tapped axial bore 17 of the crank shaft. A washer 18 may be inserted between the head of the bolt 16 and the end face of the member 3. The opposite end face of the member 3 forms a seat for the member 4 which may be in form of a sheave and is held in place by bolts 19 screwed in tapped bores 20 provided in the member 3. This sheave cooperates with a V-belt for driving the fan or other accessories of the engine.

The flange 23 of the member 3 and the member 4 confine a peripheral groove of rectangular cross-section in which the inertia-accumulators are mounted. The plane lateral faces of this groove are provided with brake linings 6' and 6" and a similar lining 6 is provided on the peripheral surface of the member 3 forming the bottom of the groove. These linings may be made of the same material as is ordinarily used for brake linings or of asbestos, leather, felt or rubber.

The two inertia-accumulators are formed by annular discs 7 and 8 which are seated on the lining 6 and between the linings 6' and 6". Their outer diameter exceeds that of the flange 23 and of the member 4 and they are provided with heavy peripheral rims to increase their momentum. The accumulator disc 8 is provided with a plurality of circumferentially distributed pockets which may be in the form of cylindrical bores 10. In each of these bores there is guided the open end of a cup-shaped sleeve designated as a whole by 13 enclosing a resilient element, preferably in form of a helical spring 14, which bears against the bottom of the pocket 10 and against the end wall 12 of the cup-shaped sleeve 13. The cup-shaped sleeves constitute plungers which bear against an annular surface provided on the inertia-accumulator 7. Preferably, this annular surface is the bottom of an annular groove 9 shown in Fig. 2, into which the sleeves 13 extend.

The cup-shaped sleeves 13 may be made of metal but consist preferably of a noise-damping material, such as fibre, asbestos, leather, felt, rubber or of the material ordinarily used for brake linings.

It is evident from the above description that each end wall 12 constitutes a slide which is interposed between the resilient element 14 and the member 7 and serves to slidably guide the resilient element relative to the member 7. The cylindrical wall 11 of the cup-shaped sleeve 13 acts as a guide which extends into the pocket 10 and connects the slide 12 with a member 8 for common rotation.

The resilient elements 14 which may be in form of buffers of a resilient non-metallic material or in form of helical springs are slightly biased so as to press the discs 7 and 8 apart and to maintain them in frictional contact with the linings 6' and 6". The frictional force is so chosen that the discs 7 and 8 may overrun the shaft 1 when the rotary speed thereof is rendered irregular by torsional oscillations until they are arrested by the frictional engagement with the brake linings 6' and 6".

A distinct advantage of my invention is the sheltered and protected location of the springs 14 within the sleeves 13, whereby they are protected from injury and dirt and undue wear.

As there is normally no relative rotation of the two momentum accumulators 7 and 8, such rotation occurring after extended operation only when the frictional coefficients of the linings 6' and 6" should differ, the members 13 may be omitted although their provision affords material advantages and constitutes an important feature of my invention.

The device may be readily disassembled when it is desired to exchange the sleeves 13 and/or the springs 14 or the linings 6', 6".

From the above description the construction and operation of my improved oscillation-damping mechanism should be clear to those skilled in the art. Since the possibility of numerous modifications thereof is obvious, it is clear that the invention is not limited to the exact details of construction shown but includes such variations and modifications as come within the scope of the appended claims.

What I claim is:

1. A mechanism for absorbing torsional oscillations of a shaft comprising a support adapted to be attached to the shaft, two adjacent inertia-accumulators rotatably mounted on and embraced by said support, one inertia-accumulator being provided with an annular surface and the other one with a plurality of pockets in opposed relationship to said annular surface, and a plurality of resilient elements encased in said pockets, bearing against the bottom thereof and directed toward said annular surface, whereby said inertia-accumulators are pressed apart and held in frictional engagement with said support.

2. A mechanism for absorbing torsional oscillations of a shaft comprising a support adapted to be attached to the shaft, two adjacent inertia-accumulators rotatably mounted on and embraced by said support, one inertia-accumulator being provided with an annular surface and the other one with a plurality of pockets in opposed relationship to said annular surface, a plurality of resilient elements encased in said pockets and bearing against said annular surface to maintain said inertia-accumulators in frictional engagement with said support, and means for slidably guiding said resilient elements on said annular surface.

3. A mechanism for absorbing torsional oscillations of a shaft comprising a support adapted to be attached to the shaft, two adjacent inertia-accumulators rotatably mounted on and embraced by said support, one inertia-accumulator being provided with an annular surface and the other one with a plurality of pockets in opposed relationship to said annular surface, cup-shaped sleeves slidably guided in said pockets, and resilient means encased within said sleeves and operative to press the same against said annular surface, whereby said inertia-accumulators are pressed apart and held in frictional engagement with said support.

4. A mechanism for absorbing torsional oscillations of a shaft comprising a support adapted to be attached to the shaft, two adjacent inertia-accumulators rotatably mounted on and embraced by said support, one inertia-accumulator being provided with an annular surface and the other one with a plurality of cylindrical bores in opposed relationship to said annular surface, cup-shaped sleeves, the open ends of said sleeves extending into said bores, and springs encased within said sleeves and operative to press the end walls of said sleeves against said annular surface, whereby said inertia-accumulators are pressed apart and held in frictional engagement with said support.

5. A mechanism for absorbing torsional oscillations of a shaft comprising a support adapted to be attached to the shaft, two adjacent inertia-accumulators rotatably mounted on and embraced by said support, one accumulator being provided with an annular groove and the other accumulator being provided with a plurality of pockets in opposed relationship to said annular groove, and a plurality of resilient elements encased in said pockets, bearing against the bottom thereof and directed toward the bottom of said groove, whereby said inertia-accumulators are pressed apart and are held in frictional engagement with said support.

6. A mechanism for absorbing torsional oscillations of a shaft comprising a support adapted to be attached to the shaft, two inertia-accumulators carried and embraced by said support and rotatably mounted thereon, resilient means interposed between said accumulators and connected for common rotation with one of the same and directed toward but rotatable relatively to the other accumulator, whereby said accumulators are pressed apart and are maintained in frictional engagement with said support.

7. A mechanism for absorbing torsional oscillations of a shaft comprising a support adapted to be attached to the shaft, two inertia-accumulators carried and embraced by said support and rotatably mounted thereon in frictional engagement therewith, one of said accumulators having an annular surface, a plurality of circumferentially distributed resilient elements mounted between said accumulators and bearing against the other one of the same, slides interposed between the annular surface of one accumulator and said resilient elements and means for connecting said slides with said other accumulator for common rotation, whereby said resilient elements and said slides will press said inertia-accumulators apart and will maintain them in frictional engagement with said support.

8. A mechanism for absorbing torsional oscillations of a shaft comprising a support adapted to be attached to the shaft, two adjacent inertia-accumulators rotatably mounted on and embraced by said support, one of said accumulators being provided with an annular surface and the other one with a plurality of pockets in opposed relationship to said annular surface, a plurality of resilient elements mounted in said pockets and bearing against the bottoms thereof, slides interposed between said resilient elements and said annular surface, and guides rigid with said slides and extending into said pockets.

9. A mechanism for absorbing torsional oscillations of a shaft, comprising a support adapted to be attached to said shaft, two adjacent inertia-accumulators rotatably mounted on and embraced by said support, one inertia-accumulator being provided with an annular groove and the other with a plurality of pockets in opposed relationship to said annular groove, a plurality of resilient elements encased within said pockets and bearing within said annular groove to maintain said inertia-accumulators in frictional engagement with said support, and means for slidably guiding said resilient elements in said annular groove.

10. A mechanism for absorbing torsional oscillations of a shaft, comprising a support adapted to be attached to said shaft, two adjacent inertia-accumulators rotatably mounted on and embraced by said support, one inertia-accumulator being provided with an annular groove and the other one with a plurality of pockets in opposed relationship to said annular groove, cup-shaped sleeves slidably guided in said pockets, and resilient means encased within said sleeves and operative to press the same into said annular groove whereby said inertia-accumulators are pressed apart and held in frictional engagement with said support.

11. The combination according to claim 3 in which said cup-shaped sleeves are made of sound absorbing material.

12. The combination according to claim 4 in which said cup-shaped sleeves are made of sound absorbing material.

13. The combination according to claim 7 in which said slides are made of sound absorbing material.

14. A mechanism for absorbing torsional oscillations of a shaft, comprising a support adapted to be attached to said shaft, two adjacent inertia-accumulators rotatably mounted on and embraced by said support, one of said accumulators being provided with an annular groove and the other one with a plurality of pockets in opposed relationship to said annular groove, a plurality of resilient elements mounted in said pockets and bearing against the bottoms thereof, slides interposed between said resilient elements and said annular groove, and guides rigid with said slides and extending into said pockets.

15. A mechanism for absorbing torsional oscillations of a shaft comprising a support adapted to be attached to said shaft, two adjacent inertia-accumulators rotatably mounted on and embraced by said support, one inertia-accumulator being provided with an annular groove and the other one with a plurality of pockets in opposed relationship to said annular groove, cup-shaped sleeves slidably guided in said pockets and helical springs encased within said sleeves and bearing against the bottoms thereof and the bottom walls of said pockets, and operative to urge said inertia-accumulators apart and in frictional engagement with said support.

16. A mechanism for absorbing torsional oscillations of a shaft, comprising a support adapted to be attached to the shaft and provided with a peripheral groove, brake linings on the side walls of said groove, two adjacent inertia-accumulators rotatably mounted in said groove, one of said accumulators being provided with an annular groove and the other one with a plurality of pockets in opposed relationship to said annular groove, and a plurality of resilient elements encased in said pockets, bearing against the bottom thereof and pressing within said annular groove to press said inertia-accumulators apart and to maintain them in frictional engagement with said brake linings.

17. A mechanism for absorbing torsional oscillations of a shaft, comprising a support adapted to be attached to said shaft and provided with a peripheral groove, brake linings on the side walls and bottom of said groove, two adjacent inertia-accumulators rotatably mounted in said groove and bearing upon said bottom brake lining, one of said accumulators being provided with an annular surface and the other one with a plurality of pockets in opposed relationship to said annular surface, and a plurality of resilient elements encased in said pockets, bearing against the bottom thereof and directed toward said annular surface to press said inertia-accumulators apart and to maintain them in frictional engagement with the brake linings on the side wall of said groove.

KARL SCHWAIGER.